(12) United States Patent
Seidl et al.

(10) Patent No.: US 6,890,128 B2
(45) Date of Patent: May 10, 2005

(54) AIR CONVEYOR FOR CONVEYING ARTICLES

(75) Inventors: Andreas Seidl, Donaustauf (DE); Alexander Sixt, Mintraching (DE); Markus Sigler, Köfering (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 10/381,837

(22) PCT Filed: Jul. 11, 2002

(86) PCT No.: PCT/EP02/07719

§ 371 (c)(1),
(2), (4) Date: Feb. 9, 2004

(87) PCT Pub. No.: WO03/011724

PCT Pub. Date: Feb. 13, 2003

(65) Prior Publication Data
US 2004/0115012 A1 Jun. 17, 2004

(30) Foreign Application Priority Data
Jul. 25, 2001 (DE) ..................................... 201 12 256 U

(51) Int. Cl.[7] .............................................. B65G 53/16
(52) U.S. Cl. ..................................................... 406/88
(58) Field of Search ................................ 406/86, 87, 88

(56) References Cited

U.S. PATENT DOCUMENTS

| | | | | |
|---|---|---|---|---|
| 5,028,174 A | * | 7/1991 | Karass | 406/88 |
| 5,161,919 A | | 11/1992 | Smith et al. | |
| 5,246,314 A | * | 9/1993 | Smith et al. | 406/86 |
| 6,494,646 B1 | * | 12/2002 | Sala | 406/88 |

FOREIGN PATENT DOCUMENTS

WO    WO 99/10263    3/1999

* cited by examiner

*Primary Examiner*—Joe Dillon, Jr.
(74) *Attorney, Agent, or Firm*—Marshall, Gerstein & Borun LLP

(57) ABSTRACT

This invention relates to an air conveyor for conveying articles with a collar and a head arranged above that, in particular plastic bottles along a conveyor channel having two carrying strips arranged along the conveyor channel on which the articles are conveyed by suspending them from the collars, and having a head space having inclined side walls formed above the carrying strips. Air nozzles, which act upon the heads of the articles, are provided in the inclined side walls. This counteracts a tendency of the articles to become tilted or jammed together.

10 Claims, 3 Drawing Sheets

AIR CONVEYOR FOR CONVEYING ARTICLES

FIELD OF THE INVENTION

This invention relates to an air conveyor for conveying articles, having a collar and a head above that, in particular for conveying plastic bottles.

Such an air conveyor is known from U.S. Pat. No. 5,161,919. The inclined side walls of the head space here may prevent excessive lifting and thus also prevents jamming of the articles between the carrying strips if the articles are high enough. However, this positive effect must be seen against the fact that the air nozzles are necessarily situated beneath the carrying strips and engage on the main body of the articles. In addition, this requires a bulky and cost-intensive design due to the air channel, which extends far downward, for supplying air to the air nozzles, since cleaning of this air channel poses problems.

There is also a conveyor which is known from International Patent WO 9910263, where the conveyor has carrying strips above which there is a head space having a rectangular cross section with a filling piece inserted into it. This filling piece is supposed to prevent an upward movement of the bottles. However, since the filling piece is inserted into the head piece as a separate part, it creates gaps and/or fissures and gradations with the walls of the head space, which is problematical from a hygiene standpoint, because such regions may lead to permanent deposits of microorganisms. However, microorganisms must be prevented absolutely, especially in the beverage area in the case of bottles to be filled.

SUMMARY OF THE INVENTION

The object of this invention is to create an air conveyor, which will reliably prevent twisting or jamming of articles without any disadvantages, in particular from the standpoint of hygiene and cost.

Due to the fact that the air nozzles are arranged in the inclined side walls of the head space, the conveyor channel or air channel may be limited to the space above the carrying strips. This results in ease of cleaning and an inexpensive design. In addition, this arrangement of the air nozzles counteracts the development of jamming. Since the bottles are lifted merely due to the design of the inclined side walls—without inserts, filling pieces or the like—this also ensures simple cleaning and an inexpensive design.

BRIEF DESCRIPTION OF THE DRAWINGS

Exemplary embodiments of the device according to this invention are described and explained below on the basis of the drawings, which show.

DETAILED DESCRIPTION OF THE INVENTION

Figure 1:
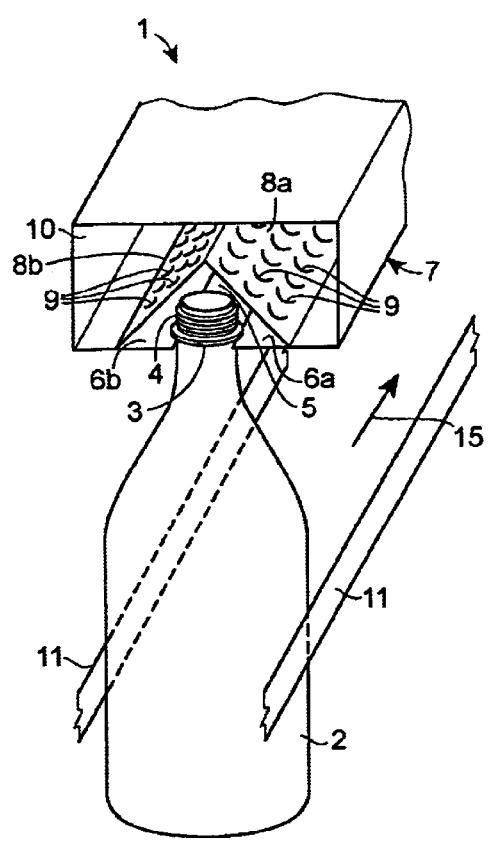
FIG. 1 a first exemplary embodiment of an air conveyor in a perspective, schematic, partial view.

FIG. 1 shows an air conveyor 1 with which the articles 2, namely PET plastic bottles in this case, are to be conveyed. Such bottles have a collar 3 and a head 4, and a thread is provided on the head so that a closure can be screwed onto it. The bottle 1 is suspended by its collar 3 on carrying strips 6a and 6b. The carrying strips 6a and 6b border the head space 5 at the bottom, i.e., they define the space in which the head 4 of the bottle is located during conveyance.

The head space 5 has inclined side walls 8a and 8b which form an angle in the upper area of head space 5, in particular an acute angle. Due to the fact that the side walls 8a and 8b are inclined inward, they may serve as a stop to limit the lifting or tilting of the bottles 2. If a bottle 2 is to be raised or tilted by the stream of air, by other bottles or by other means, the upper end of head 4 will strike the side walls 8a and 8b from beneath and will thus limit the lifting or tilting movement even before the widened part of the neck of the bottle can become jammed between the carrying strips 6a and 6b. This is explained in greater detail below.

Air is blown into the head space 5 through air nozzles 9 in the form of flaps in the direction of conveyance 15, so that air acts upon the bottles 2 in the head part 4 so that they are set in motion or kept in motion.

Above the head space 5 there is an air supply channel 10 which is supplied with air from an air pressure source, which is not described in greater detail here. Air flows out of the air supply channel 10 through the nozzles 9 and thus exerts a force on the bottles 2 for the conveyance movement.

Additional optional lateral guide devices 11 are also shown in the lower portion of FIG. 1; these serve to prevent the bottle 2 from tilting laterally.

The conveyor channel 7 shown here thus includes at least the head space 5 with its inclined side walls 8a, 8b as lateral borders as well as the carrying strips 6a, 6b, which border the head space at the lower end.

Due to this design of the lateral essentially planar side walls 8a and 8b as stops, an especially simple and inexpensive means of manufacturing the air conveyor is thus possible. Likewise, due to the simple design, this yields a head space which does not have any fissures or gaps in which microorganisms can persist, multiply and propagate. Cleaning of an air conveyor according to this invention is very simple due to this design of the head space 5.

Figure 2:
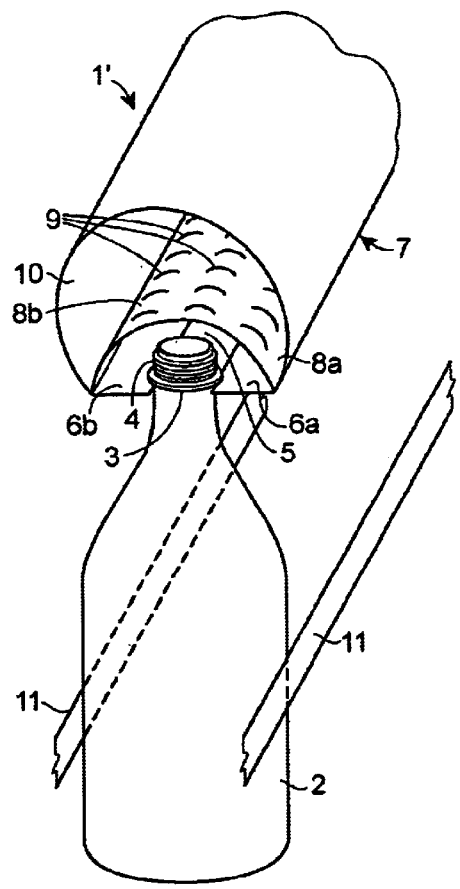
FIG. 2 a second embodiment of an air conveyor in the same view as in FIG. 1.

FIG. 2 shows another embodiment of an air conveyor 1' according to this invention. Functionally identical components are provided with the same reference notation. Instead of a head space 5 having a triangular cross section, as illustrated in FIG. 1, the head space 5 in FIG. 2 has an essentially semicircular or arc-shaped cross section. Here again, the curved side walls 8a and 8b of the head space 5 form a stop to limit the tilting and lifting of the bottle 2. Instead of an air channel 10 having a rectangular cross section, an air channel 10 having a round cross section is provided here. Any combinations of air channels 10 in FIGS. 1 and 2 with the head space cross sections from FIGS. 1, 2 and 3 are possible within the scope of the present invention.

The conveyor channel 7 illustrated in FIG. 2 thus includes at least the head space 5 with its round side walls 8a, 8b as well as the carrying strips 6a, 6b, which border the head space at the bottom.

Figure 3A:
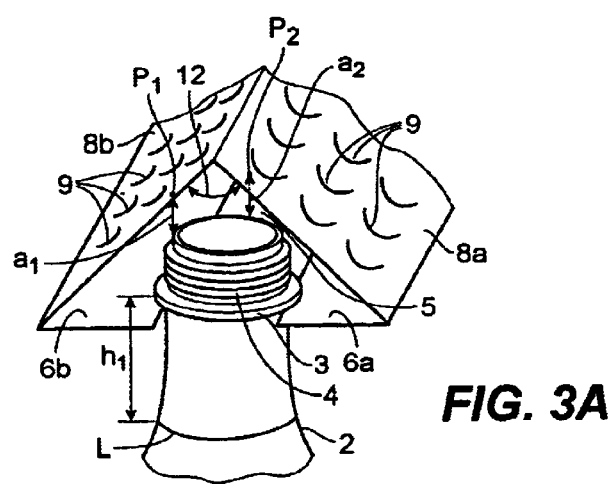
FIGS. 3a through 3b a detail from FIG. 1 in various embodiments.

FIG. 3a shows a detailed enlargement of the air conveyor 1 shown in FIG. 1, in particular its head space 5. Bottle 2 rests with its collar 3 on the carrying strips 6a and 6b arranged at the sides, so it may move forward or in reverse along the carrying strips, depending on the direction of the air flow in the head space 5. Air slits, air nozzles or other orifices 9 are provided in the side walls 8a and 8b and are suitable for deflecting the stream of air onto the head 4 of the bottle 2. Due to the stream of air directed in this way, the bottle 2 may be set in motion. The angle 12 between the side walls 8a and 8b amounts to approximately 90 degrees in the exemplary embodiment shown here.

FIG. 3a also shows that the lateral carrying strips 6a and 6b are arranged essentially horizontally in the direction across the air conveyor, so that the collar 3 is in surface contact with the carrying strips 6a and 6b when the bottle 2 is hanging down vertically. Due to the carrying strips, which are arranged horizontally, the position of the bottle 2 in which it is hanging vertically downward is stabilized in particular.

Figure 3B:
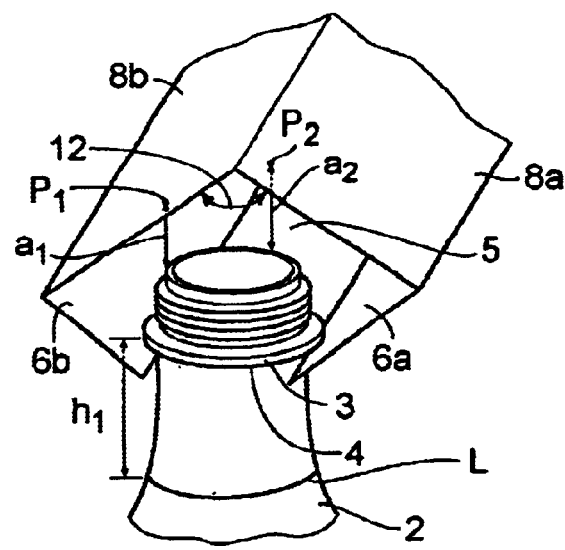

However, FIG. 3b shows an embodiment of this invention in which the carrying strips 6a and 6b are inclined inward at the bottom. Therefore, the collar 3 is only in point contact with one of the carrying strips 6a and 6b. This facilitates a free back-and-forth pendulum swinging movement of the bottle 2. Another possible implementation would involve a combination of the inclined carrying strips 6a and 6b as illustrated in FIG. 3b with the rounded lateral walls 8a and 8b as illustrated in FIG. 2.

FIGS. 3a and 3b also show the dimensions, which are important for the design of the head space 5 as a stop for a bottle 2 which is to be conveyed. It should be pointed out that the distance between the head edge or the mouth edge of the bottle and the stop point P1 with a vertical lifting movement is smaller than the length h1 of the neck of the bottle whereby the length h1 of the neck of the bottle here denotes the distance between the bottom side of the collar 3 of the bottle and an imaginary peripheral line L on the neck of the bottle at the location where the diameter of the neck of the bottle corresponds to the distance between the carrying strips 6a, 6b.

In addition, the distance a2 between the edge of the mouth and the location on the wall of the channel where the head 4 comes to a stop at point P2 in a tilting motion is selected so that stopping occurs at an angle at which the widening neck of the bottle has not yet come to a stop on the bottom side of the carrying strips 6a, 6b.

Figure 4:
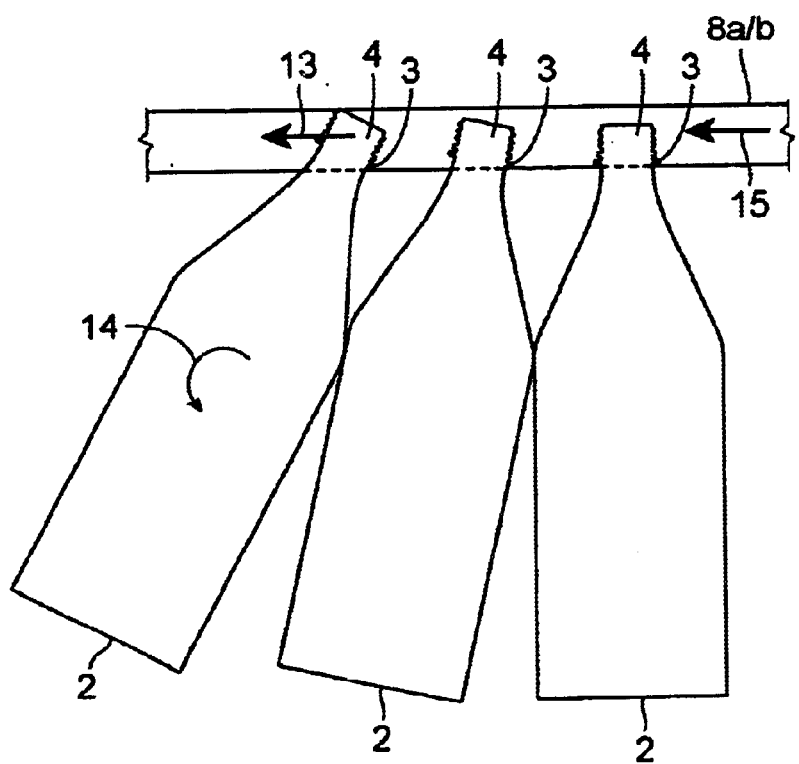
FIG. 4 a schematic diagram to illustrate the functioning of the air conveyor according to this invention in breaking up log jams.

FIG. 4 illustrates a particular advantage of the air conveyor according to this invention, which results from the fact that the air nozzles are situated in the inclined side walls 8a, 8b of the head space 5, i.e., at the height of the head 4 of the bottles 2, where the direction of conveyance is indicated by the arrow 15. When there is a log jam of bottles 2 in the air conveyor 1, the bottles often become fanned out as illustrated in FIG. 4. Due to deceleration of the bottles 2 with the collar 3 on the carrying strips 6a, 6b, the body of the bottle 2 is deflected forward in relation to its head part 4. This is supported in particular by the following bottles 2, each of which presses with its body against the others. Due to the fact that the driving air current acts in the area of the head 4 of the bottles, a force is exerted on the head 4 in the direction of the arrow 13, so that this results in a directional torque 14 on the bottles 2. This directional torque results in a breakup of such log jams as illustrated in FIG. 4, which is thus a great advantage for long-term operation of such an air conveyor. If such log jams do not automatically break up, manual intervention is necessary, but that is often associated with delays in production and stoppage of machines that should be operating continuously. Therefore, automatic breakup of log jams as illustrated in FIG. 4 is a great advantage.

This advantage is obtained in particular due to the design of the air conveyor head space 5 as a stop for the bottles 2. Due to this design as a stop, the cross section of head space 5 has a relatively small area, so that there is a definite increase in pressure upstream from the head of the bottle in the event of a log jam, because the air cannot flow further through the head space 5 through the narrow cross section. Thus, especially in the case of a log jam, an especially high log jam resolving force acts on the bottles due to the narrow cross section.

As an alternative to the arrangement of air nozzles 9 alone in the side walls 8a, 8b, air nozzles 9 may also be arranged in any other part bordering the head space 5. For example, this is illustrated in FIG. 2, where air nozzles are also shown in the upper part of the head space 5, which connects the curved side walls 8a, 8b.

In the exemplary embodiments illustrated in FIGS. 1, 2 and 3, the side walls 8a and 8b are designed in one piece or are made of one cohesive part. In FIG. 1, for example, this is an angle having legs that form the side walls 8a and 8b. FIG. 2 shows a portion of a tube for limiting the head space 5 at the top. Due to the fact that the side walls 8a and 8b are made of a single part, any hygiene problems that might occur due to fissures and gaps in the area of the head space are prevented. Furthermore, such a head space which contains very few angles is extremely easy to clean.

The side walls in FIG. 1 may be manufactured from a prefabricated angle section, for example. It is also possible to manufacture the walls 8a and 8b separately and then weld them together in the upper area of angle 12.

For the PET bottles, which are used especially widely in the beverage industry, have a head diameter of 25 mm and a head height of 21 mm, including the collar (form PCO 20). The resulting geometry of the head space 5 according to FIG. 3a yields an optimum transport function. The angle 12 between the side walls 8a and 8b amounts to 70 degrees, and the height of the head space 5 over the horizontal supporting surface of the carrying strips 6a, 6b amounts to 45.5 mm. This results in a distance a1 of approximately 6.2 mm. Such an air conveyor 1" is shown in detail in FIG. 5.

Figure 5:
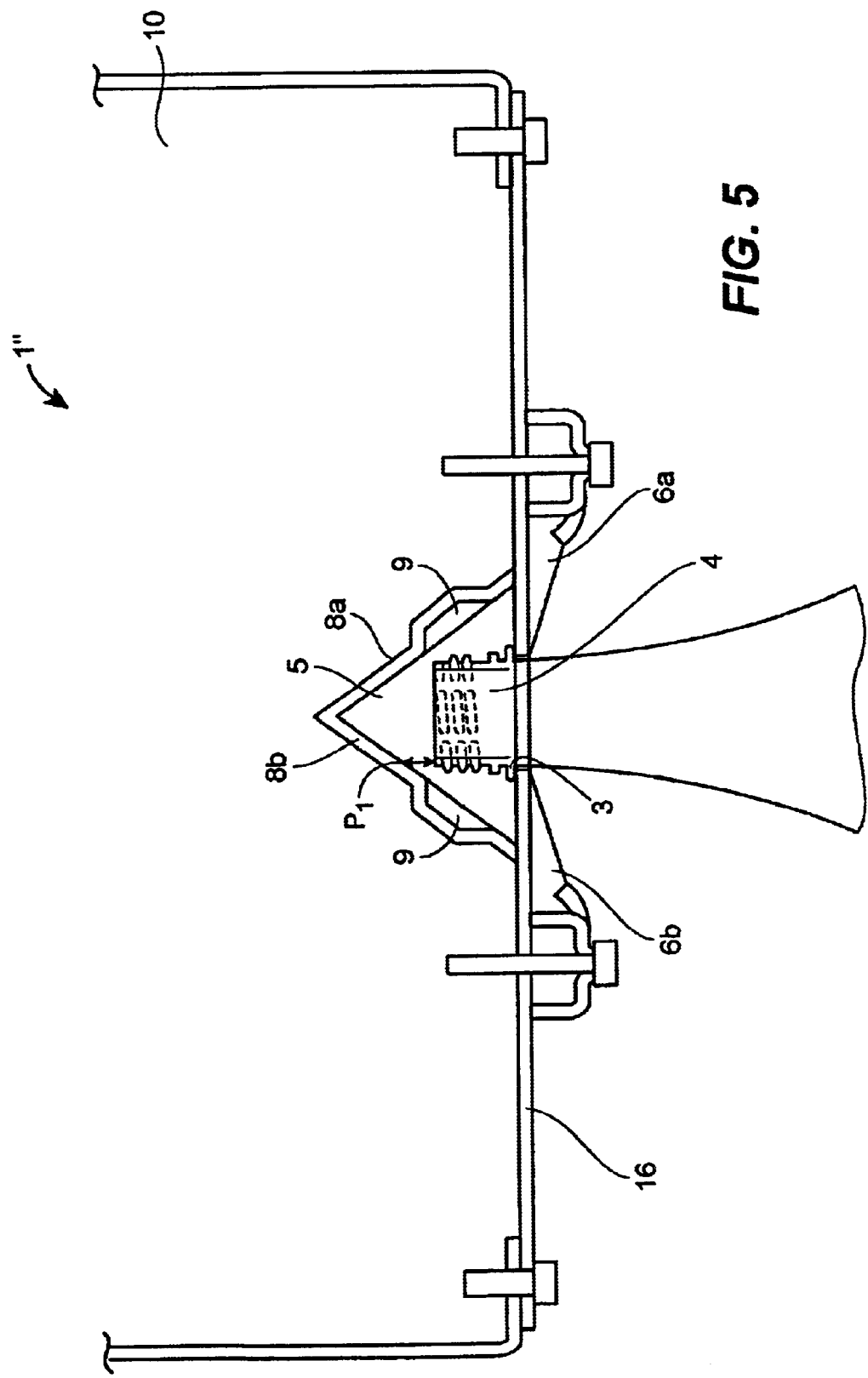
FIG. 5 a third exemplary embodiment of an air conveyor in a vertical section.

In the case of the air conveyor 1" according to FIG. 5, the two inclined side walls 8a, 8b are manufactured in one piece with an otherwise planar horizontal bottom part 16 of the air channel 10. This measure also contributes toward low manufacturing costs and a hygienic design without gaps. On the bottom side, the carrying strips 6a, 6b are detachably mounted by means of screws and clamps on the bottom part 16, which is at the same level as the neck collar 3 of the bottles 2.

The air nozzles 9 in this embodiment are limited to that part of the head space 5 which is beneath the point of contact P1. This results in an absolutely smooth continuous stop surface for the bottle head 4 and reliably prevents the bottles from becoming stuck.

What is claimed is:

1. An air conveyor (1) for conveying articles (2) having a collar (3) and a head (4) above it, including plastic bottles, comprising: a conveyor channel (7) having two carrying strips (6a, 6b) which are arranged along the conveyor channel and on which the articles are conveyed as they hang by their collars, air nozzles (9) arranged along the conveyor channel to allow air to act on the articles, a head space (5) above the carrying strips for containing the head of the bottle during conveying, the head space (5) having inclined side walls (8a, 8b), the air nozzles (9) being provided in the inclined side walls (8a, 8b) of the head space (5) and acting upon the heads (4) of the articles conveying said articles (2), and wherein the angle of the inclined side walls are such that said side walls (8a, 8b) operate as stops to limit the lifting or tilting of the articles (2).

2. The air conveyor according to claim 1, wherein the inclined side walls (8a, 8b) of the head space (5) with the air nozzles (9) are smooth on the inside.

3. The air conveyor according to claim 1, wherein the head space (5) has a roof shape.

4. The air conveyor according to claim 1, wherein the head space (5) has a rhomboid form.

5. The air conveyor according to claim 1, wherein the head space (5) has an arc shape.

6. The air conveyor according to claim 1, and an air supply channel (10) is provided laterally and above the head space (5) to supply blasting air to the air nozzles (9).

7. The air conveyor according to claim 1, wherein the carrying strips (6a, 6b) are arranged essentially horizontally.

8. The air conveyor according to claim 3, wherein the angle (12) formed between the inclined side walls (8a, 8b) corresponds to approximately 70 degrees and the height of the head space (5) corresponds to approximately 45.5 millimeters.

9. The air conveyor according to claim 1, wherein the lower limit (16) of one of the conveyor channel (7) and the air supply channel (10) is situated at the height of the collar (3) of the articles (2), and the carrying strips (6a, 6b) are mounted on the essentially horizontal lower side of the lower limit (16).

10. The air conveyor according to claim 1, wherein the air nozzles (9) are arranged in the area of head space (5), which is beneath the stopping point (P1) of the head (4) on the inclined side walls (8a, 8b).

* * * * *

UNITED STATES PATENT AND TRADEMARK OFFICE
CERTIFICATE OF CORRECTION

PATENT NO. : 6,890,128 B2
DATED : May 10, 2005
INVENTOR(S) : Andreas Seidl et al.

It is certified that error appears in the above-identified patent and that said Letters Patent is hereby corrected as shown below:

<u>Title page,</u>
Item [30], Foreign Application Priority Data, "201 12 256 U" should be
-- 201 12 256.1 --.
Item [57], ABSTRACT,
Line 1, "This invention relates to an air conveyor for conveying ..." should read -- An air conveyor for conveying ... --.
Line 3, "particular plastic bottles along a conveyor channel having" should read
-- particular plastic bottles, having a conveyor channel with --.

Signed and Sealed this

Sixth Day of September, 2005

JON W. DUDAS
*Director of the United States Patent and Trademark Office*